United States Patent

Lemke

[15] 3,693,183

[45] Sept. 19, 1972

[54] MAGNETIC PRINTING UTILIZING THERMAL GRADIENTS

[72] Inventor: James U. Lemke, Del Mar, Calif.

[73] Assignee: Bell & Howell Company, Chicago, Ill.

[22] Filed: July 19, 1971

[21] Appl. No.: 164,110

Related U.S. Application Data

[63] Continuation of Ser. No. 757,063, Sept. 3, 1968, abandoned.

[52] U.S. Cl. ....................346/74 MT

[51] Int. Cl. ....................H01v 3/04

[58] Field of Search ..........346/74 M, 74 MT, 74 P; 179/100.2 CF, 100.2 CR; 250/65.1; 340/174 YC

[56] References Cited

UNITED STATES PATENTS

| | | | |
|---|---|---|---|
| 2,793,135 | 5/1957 | Sims et al. | 346/74 X |
| 3,161,544 | 12/1964 | Berry | 346/74 X |
| 3,217,330 | 11/1965 | Schwertz | 346/74 |
| 3,472,695 | 10/1969 | Kaufer et al. | 346/74 X |
| 3,474,456 | 10/1969 | Stoft et al. | 346/74 |

*Primary Examiner*—Bernard Konick
*Assistant Examiner*—Gary M. Hoffman
*Attorney*—Luc P. Benoit

[57] ABSTRACT

Apparatus for producing optically and magnetically discernible prints of information has an endless magnetic recording medium for providing an erasable magnetic record of the information in response to thermal gradients and an endless transducer medium for providing electrical gradients representative of the information. An electrical energy supply enables the electrical gradients to provide thermal gradients producing the erasable magnetic record. This magnetic record is printed out with a magnetic toning agent and is thereafter erased.

9 Claims, 4 Drawing Figures

INVENTOR.
JAMES U. LEMKE

MAGNETIC PRINTING UTILIZING THERMAL GRADIENTS

CROSS-REFERENCES TO RELATED APPLICATIONS

The following copending applications deal with subject matter related to that of the present application:

This application is a continuation of Ser. No. 757,063 filed Sept. 3, 1968 and now abandoned.

Patent application serial No. 756,942, Magnetic Imaging, by Joseph Gaynor and James U. Lemke, filed Sept. 3, 1968 and assigned to the subject assignee;

Patent application Ser. No. 696,601, now abandoned, Apparatus for Magnetically Copying Information, by James U. Lemke, filed Jan. 9, 1968 and assigned to the subject assignee;

Patent application Ser. No. 649,540, now U.S. Pat. No. 3,541,577 Magnetic Information Recording, by James U. Lemke, filed June 28, 1967, and assigned to the subject assignee.

BACKGROUND OF THE INVENTION

1. Field of the Invention

The subject invention relates to information recording and, more particularly, to the production of optically and magnetically discernible information records.

2. Description of the Prior Art

The art of information recording is that pervasive, that any informative description thereof must of necessity focus itself on certain selected areas.

Accordingly, the subject invention is primarily contrasted herein to the prior art in the oscillography area, although the scope and utility of the invention is much broader, as will be apparent or pointed out at appropriate instances as this description proceeds.

A major cost factor in all oscillography operations is the consumption of oscillograph paper on which traces of variable input signals are made to appear. This cost factor is of a continuing nature and may reach extreme proportions as the paper speed is increased in the recording of rapidly varying parameters.

The highest paper expenses are generally encountered in oscillograph processes in which deflected light beams or traveling spots on a cathode-ray oscillograph are recorded on photosensitive paper. The paper costs are also high in apparatus in which traces are recorded on heat-sensitive media by means of heated styli, or on electrically conductive chart papers covered by a coating of insulating material which is burned by electrical discharges.

Fairly inexpensive oscillograph paper may, on the other hand, be used in apparatus in which oscillograph traces are written by means of pens or spray jets. However, the recording speed of such equipment is limited by the inertia of the writing or spraying instrument.

Accordingly, the need for an oscillography process which permits the use of inexpensive printout paper without severe limitations on the printout speed persists in the art.

Similar problems are encountered in the art of imaging in general, in which the need for processes which produce inexpensive prints of images exists. Prior-art proposals in this area are discussed in the above mentioned copending patent application Ser. No. 756,942. The commercially most successful methods in this field provide electrostatic charge patterns corresponding to the image to be recorded and employ an electrostatically attracted toner for the printout of these patterns.

This, however, requires the use of special high-voltage equipment which is expensive and bulky and requires particular safeguards against it inherent dangers. Also, ionization and corona discharge phenomena limit attainable charge densities and introduce neutralization effects which impair contrast and resolution of the resulting images.

These disadvantages are not present in printout techniques which have been classified as "magnetic printing" (see Schaffert, ELECTROPHOTOGRAPHY (Focal Press 1965), pp. 123–25). One type of magnetic printing employs recording heads or styli for providing a magnetic image suitable for printout with a magnetic ink or powdered toner. The use of recording heads or styli introduces severe limitations in terms of recording speed and resolution.

Other magnetic recording methods involve the provision of thermal images corresponding to the information to be recorded, and the use of low-Curie point media which are functionally responsive to the thermal images and which may be printed out by a magnetic ink or toner. While these methods are promising in that they permit the use of relatively inexpensive printout paper their processing speed and generally high energy requirements leave much to be desired.

SUMMARY OF THE INVENTION

The subject invention presents a solution to these problems which proceeds on a technique in which electrical gradient patterns representing the information to be recorded are provided on an endless medium which provides corresponding magnetic gradient patterns in response to thermal gradient patterns produced by the electrical gradient patterns just mentioned.

More specifically, the subject invention provides apparatus for producing optically and magnetically discernible prints of information, comprising an endless magnetic recording medium for providing an erasable magnetic record of said information in response to thermal gradients representative of said information, endless means operatively associated with said endless magnetic recording medium for providing electrical conductivity paths representative of said information, means supplying electrical energy to said endless means for establishing in said information-representative conductivity paths information-representative electrical gradients generating said information-representative thermal gradients in said magnetic recording medium, means for jointly moving said endless magnetic recording means and said endless means, means operatively associated with said endless means for applying said information to successive portions of said endless means whereby to establish said magnetic record of said information in successive portions of said endless magnetic recording medium, means for applying a magnetic printout agent to said magnetic record to produce a printable pattern manifesting said information, means for printing said pattern on a printout carrier, and means for erasing said magnetic record after printout.

If the information is contained in an optical image as in the case of a deflected light beam, the above mentioned endless medium preferably includes photoconductive means for providing the required electrical gradient pattern in response to incident light gradient patterns.

From another aspect thereof, the invention provides apparatus for producing a visually and magnetically discernible oscillograph trace of a varying input signal, comprising in combination a rotatable drum, an endless magnetic recording medium on said drum for providing an erasable magnetic trace in response to thermal gradients, transducing means on said drum for providing electrical conductivity paths in response to radiant energy, means supplying electrical energy to said transducing means on said drum for establishing in said conductivity paths electrical gradients generating said thermal gradients in said magnetic recording medium, means for projecting a beam of said radiant energy onto said transducing means on said drum, means coupled to said drum for rotating said drum relative to said beam of radiant energy, means for laterally deflecting said beam of radiant energy in response to said varying input signal whereby to provide in said endless magnetic recording medium an erasable magnetic trace representative of said varying input signal, means for printing out said magnetic trace with a magnetic printout agent, and means for erasing said magnetic trace after printout thereof.

As this description proceeds, it will be noted that this apparatus has several advantages over conventional oscillograph apparatus. For instance, relatively inexpensive paper may be employed for the above mentioned web of material on which the oscillograph trace is printed out. Also, the trace is immediately accessible after the printout, with no photographic development of the printout paper being necessary. Moreover, the apparatus under discussion permits the use of fast-acting light beam deflectors and thus overcomes the drawbacks as to speed and resolution of those methods which employ magnetic recording heads or styli in magnetic printing techniques.

BRIEF DESCRIPTION OF THE DRAWINGS

The invention and further aspects thereof will become more readily apparent from the following detailed description of preferred embodiments of the invention, illustrated by way of example in the accompany drawings in which.

DESCRIPTION OF PREFERRED EMBODIMENTS

Figure 1:
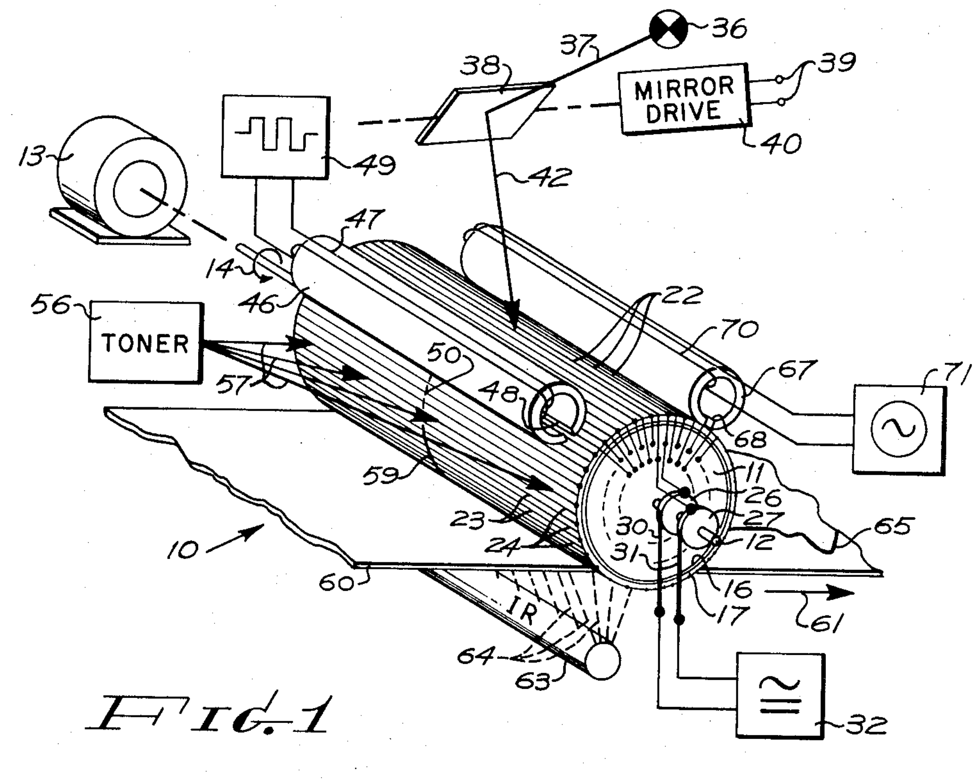
FIG. 1 is a perspective view of essential parts of an oscillograph apparatus according to the subject invention.

The oscillograph apparatus 10 shown in FIG. 1 includes a drum 11 mounted on a rotatable shaft 12. A suitable drive 13, which may include an electric motor and a reduction gear (not shown), rotates the drum 11 and shaft 12 in the direction of arrow 14.

An endless layer 16 of a magnetic recording medium is disposed on the periphery of the drum 11, while an endless layer 17 of a photoconductive medium encompasses the layer 16 and is in heat-transfer relationship therewith.

The layer 16 preferably includes magnetizable particles 20 (see FIG. 2) which have a relatively low Curie point at which they lose their ferromagnetic properties. Suitable media are, for instance, described in the Belgian Patent 690.598, dated Dec. 2, 1966, by E. I. du Pont de Nemours and Company, and in the copending Patent Applications Ser. Nos. 649,540 and 696,601, filed respectively on June 28, 1967 and Jan. 9, 1968, by James U. Lemke, and assigned to the subject assignee. To name an example, the particles 20 may be chromium dioxide particles having a Curie point in the 100° C range.

Suitable materials for the photoconductive layer 17 include cadmium sulfide, cadmium selenide, a photoconductive selenium tellurium alloy, sensitized zinc oxide or lead sulfide, to name a few illustrative examples.

A plurality of electrode means 22 are disposed on and distributed over the photoconductive layer 17. The electrode means 22 include first elongated electrodes 23 which are spaced from each other and which extend in the general direction of the shaft 12. The electrode means 22 include further elongated electrodes 24 which are also mutually spaced from each other and from the electrodes 23, and each of which is disposed between an adjacent pair of the electrodes 23. The electrodes 23 and 24 may consist of thin wires which are partially embedded in the layer 17 at the outer periphery thereof. Alternatively, the electrodes 23 and 24 may be deposited on the layer 12 by such techniques as metal sputtering.

Each of the electrodes 23 is electrically connected with a slip ring 26 mounted on the shaft 12, while each of the electrodes 24 is connected to a further slip ring 27 also mounted on the shaft 12. In accordance with conventional practice, the slip rings 26 and 27 are electrically insulated from each other and from the shaft 12. An electrical contact brush 30 engages the slip ring 26, while the slip ring 27 is engaged by an electrical contact brush 31.

The brushes 30 and 31 are connected to output terminals of a source 32 of electrical current. To name an example, the source 32 may supply direct current to the brushes 30 and 31, so that the electrodes 23 are either positive or negative with respect to the electrodes 24. If desired, the source 32 may supply the brushes 30 and 31 with electric alternating current so that the electrodes 23 are of a polarity opposite the electrodes 24 at any instant during the supply of the current by the source 32.

The apparatus illustrated in FIG. 1 further includes a source of light 36 which projects a beam of light 37 against a mirror 38. The signal to be recorded is applied to input terminals 39 of a mirror drive 40. In accordance with conventional practice, the mirror drive 40 and mirror 38 may be part of a mirror-galvanometer device employed in typical oscillograph apparatus.

The drive 40 oscillates the mirror 38 in response to variations of the input signal applied at the terminals 39 so that the reflected light beam 42 is accordingly deflected in a plane intersecting the drum shaft 12.

The photoconductor layer 17 becomes electrically conductive where it is hit by the deflected light beam 42 which is made sufficiently wide to provide for the flow of electrical current from the source 32 and through adjacent electrodes 23 and 24 in the regions where photons from the beam 42 impinge on the layer 17. An electrical current gradient is thus established in the region just defined. Flow of electric current through the photoconductor 17 causes the generation of a corresponding thermal gradient at such point. Heat energy from this thermal gradient flows into the layer 16 which is in heat-transfer relationship with the photoconductor layer 17. The intensity of the electrical energy supplied by the source 32 is sufficient so that the thermal gradient under discussion causes a heating of particles in the layer 16 to a temperature above their Curie point.

To permit the particles to reach the latter temperature and to avoid a premature cooling of such particles, the drum 11 is preferably of a heat-insulating material or, if made of metal, preferably has a heat-insulating layer between the layer 16 and the body of the drum 11. If desired, the drum may be heated to a predetermined threshhold temperature below but in the vicinity of the Curie point of the particles 20, so that the thermal gradients generated in the medium 16 by action of the medium 17 need only heat the layer 16 by a few degrees. An electric resistance element 73 shown in dotted lines in FIG. 2 symbolically illustrates a means for preheating the drum 11 and layer 16, although it will be understood that such a drum heating means would preferably have to be energized through suitable slip ring means (not shown).

While these heated particles are still at a temperature above their Curie point, the rotation of the drum 11 causes them to be moved inside a magnetic field 45 (see FIG. 2) provided by an elongated magnet core 46 which has an electric winding 47 and which defines an air gap 48 that extends in parallel to the shaft 12. The width of the magnetic field 45 and the rate of rotation of the drum 11 are such that the particles 20 cool to a temperature below their Curie point while still located within the magnetic filed 45. As known in the art, such a cooling of magnetizable particles in the presence of a magnetic field strongly magnetizes these particles by operation of the phenomenon known as thermoremanent magnetization (see the above mentioned Belgian patent and copending Lemke applications).

As shown in FIG. 1, the core winding 47 is supplied with electric current from a source 49 of electrical energy. In principle, the current supplied to the winding 47 may be a direct current. However, it is generally more advantageous to energize the winding 47 with an alternating or square-wave current so that adjacent groups of particles in the medium 16 are magnetized in opposite senses. This provision of alternating magnetic gradients in the medium 16 improves the resolution of the resulting trace, since magnetic printout or toner particles are more readily attracted by alternating magnetic gradients than by uniform magnetic fields.

While for the purpose of a better visibility of the beam 42 the magnet core 46 has been shown as being somewhat spaced from such beam, it should be understood that the danger that the particles cool to a temperature lower than their Curie point before encountering the field 45 is generally lessened if the gap 48 is much closer to the point of impact of the beam 42 than as shown in the drawings. It should also be understood that the magnetic particles 20, which have a sloping remanence characteristic near their Curie point should preferably cool down to a region of substantially stable remanence while under the influence of the magnetic field 45.

As successive portions of the magnetic medium in the layer 16 are heated by action of photoconductor material in the layer 17 in response to photons in the beam 42, a magnetic trace 50 of the movements of the beam 42 will appear in the medium 16 upon the continuous operation of the thermoremanent magnetization process just described. A magnetic printout agent is thereupon applied to the outer surface of the layer 17 to provide a printable trace 59 corresponding to the movements of the beam 42. Since theremoremanent magnetization provides relatively strong magnetic gradients, it is quite possible to make the magnetic field 45 weak enough so that unheated portions of the layer 16 are not magnetized thereby.

Figure 4:
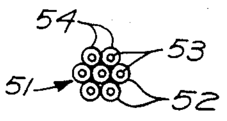
FIG. 4 is an enlarged cross-section through a small supply of printout toner useful in the apparatus shown in FIG. 1 or the modifications shown in FIGS. 2 and 3.

As illustrated in FIG. 4, the magnetic printout agent 51 preferably includes a powdered toner which is composed of particles 52. Each of these toner particles has a core 53 of magnetizable or ferromagnetic material enclosed in a shell 54 of a fusible substance, such as a wax or a thermoplastic material.

A toner applicator 56 applies the magnetic toner 51 to the drum 11 as symbolically illustrated by arrows 57 in FIG. 1.

Toner applicator means are already known in the art, and are thus not specifically illustrated herein (see, for instance, U.S. Pat. Nos. 2,932,278 and 2,996,575 issued, respectively, Apr. 12, 1960 and Aug. 15, 1961, by J. C. Sims).

Toner particles which are attracted by the magnetic trace 50 adhere to the layer 17 and form the corresponding printable trace 59 thereon. A suitable printout carrier 60 is moved in the direction of arrows 61 and is pressed against the outer surface of the layer 17 so as to pick up the toner trace 59 therefrom. Roller means (not shown) biased against the layer 17 may be employed to assure a sufficient contact between the paper 60 and the layer 17 to provide for a transfer of the toner trace 59 from the drum onto the printout carrier. As illustrated in FIG. 1, a source 63 of infrared radiations 64 may be used to heat the paper 60 and the toner trace 59 so as to facilitate a fusion of the toner trace onto the paper 60 and a fusion of adjacent particles in such trace to each other. The resulting, printed-out oscillograph trace is shown at 65. If desired, the paper 60 may be a transparent medium permitting the printout of traces that can be optically projected on a screen.

As the rotation of the drum 11 proceeds, the printed-out magnetic trace is continuously erased from the layer 16 so that the drum 11 is continuously readied for a further magnetic recording and printout of oscillations of the beam 42. According to a preferred embodiment illustrated in FIG. 1, erasing is effected by means of a magnet core 67 which defines an elongated air gap 68 along the drum 11 and substantially parallel to its shaft 12. The core 67 has a winding 70 energized from a source 71 with alternating electric current so as to provide the required erasing field at its air gap 68 and through the magnetic layer 16.

It will now be recognized that the apparatus illustrated in FIG. 1 provides several material advantages. For instance, the oscillograph trace 65 becomes immediately available for inspection, with no photographic development processes being required. This is a very important feature in modern oscillography applications in which rapid variations of the trace frequently indicate an urgent necessity for corrective action in the processes being observed.

As a further advantage, no expensive oscillograph print-out or develop-out papers are required in the apparatus according to the invention. As modern processes call for increased paper speeds, the economic advantages realized from a use of inexpensive oscillograph papers are of a very significant order and easily justify an investment in the equipment of the type shown herein. Also, the traces 65 produced pursuant to the subject invention are stable and durable, in contrast to the traces produced on some prior art rapid printout papers.

Figure 2:
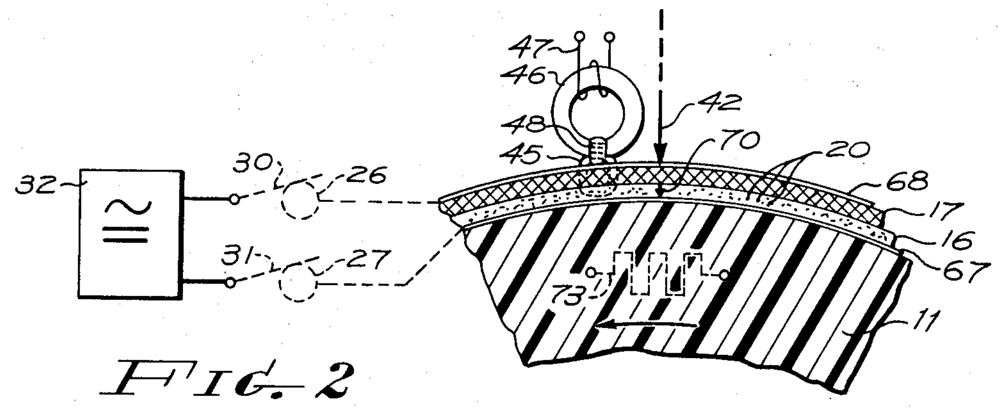
FIG. 2 illustrates a modification of the apparatus shown in FIG. 1, in accordance with a first preferred embodiment of the invention.

A modification of the apparatus shown in FIG. 1 is illustrated in FIG. 2.

According to FIG. 2, the magnetic recording medium layer 16 and the photoconductor layer 17 are sandwiched between endless electrodes 67 and 68. This arrangement takes advantage of the fact that magnetic recording media can be made to be electrical conductors or at least semi-conductors. The electrode 67 is in electrical contact with the magnetic recording layer 16, while the electrode 68 is light-transparent and is in contact with the photoconductor layer 17. The source 32 applies power to the electrodes 67 and 68 through the brushes 30 and 31 and slip rings 26 and 27 more fully illustrated in FIG. 1.

The photoconductor layer 17 becomes electrically conductive where it is hit by the light beam 42 so that an electric current gradient is established at such location. In FIG. 2, this gradient extends through the layers 16 and 17 and provides a corresponding thermal gradient 70 in the layer 16. The energy supplied by the source 32 is sufficient to raise the temperature of the medium 16 at the location of the arrow 70 to a temperature above the Curie point of the magnetic recording particles 20. As the medium is moved in the magnetic field 45 discussed above, and cools in such field, it will be strongly magnetized by the above mentioned thermoremanent magnetization principle. In this fashion, a magnetic trace of the deflecting light beam 42 of the type shown at 50 in FIG. 1 is established on the drum structure illustrated in FIG. 2.

It will be recognized that the layer arrangement 16 and 17 corresponds to the layer arrangement 15 and 18 shown in the above mentioned copending patent application Ser. No. 756,942.

If desired, the required current gradients may be induced in the layers 16 and 17 rather being applied thereto by means of electrodes.

Figure 3:
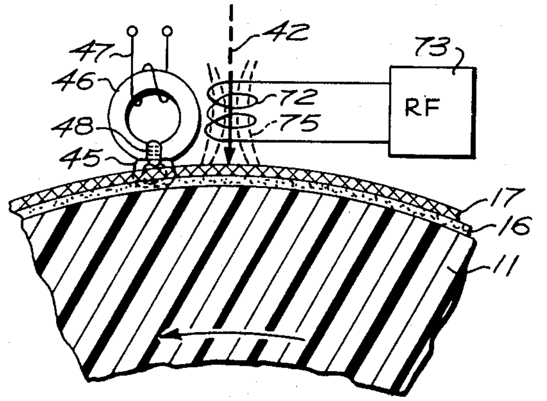
FIG. 3 illustrates a second modification of the apparatus shown in FIG. 1, in accordance with a further preferred embodiment of the subject invention.

Such a solution is illustrated in FIG. 3 in which a radio frequency coil 72 is energized from a source 73 of electrical radio frequency energy and is located at the region of impact of the deflected light beam 42. In practice, the cross-section of the coil 72 should be sufficiently elongated in a direction parallel to the axis of the drum 11 so as to accommodate lateral deflections of the light beam 42.

The coil 72 generates a magnetic radio frequency field 75 which permeates the layers 16 and 17. Where the light beam 42 renders the photoconductor layer 17 electrically conductive, electric current gradients are induced by the radio frequency field 75 and corresponding thermal gradients are generated in the layer 16 so that thermoremanent magnetization thereof will take place upon cooling in the magnetic field 45 as described above. If desired, a composite photoconductive and magnetic recording medium of the type shown at 50 in the above mentioned copending patent application Ser. No. 756,942 may be employed. In either case, the absence of contacting electrodes in the embodiment of FIG. 3 materially facilitates its structure.

The principles and features disclosed herein are not restricted in their application to the field of oscillography. The structure which provides the deflecting light beam 42 may be replaced by equipment which projects images onto the periphery of the drum structure 11. In this manner, images of illustrations, pictures, text and the like, rather than mere traces, may be printed out in a continuous fashion in reliance on the principles, methods and apparatus disclosed herein.

As a major advantage, the traces or image elements printed out in accordance with the subject invention are not only visually observable, but are also magnetically discernible. This permits the equipment shown herein to be advantageously combined with magnetic data reading and information processing systems.

While specific embodiments of the invention have been disclosed and illustrated herein, modifications within the scope and spirit of the subject invention will become readily apparent or will suggest themselves to those skilled in the art.

I claim:

1. Apparatus for producing optically and magnetically discernible prints of information, comprising in combination:

an endless magnetic recording medium for providing an erasable magnetic record of said information in response to thermal gradients representative of said information;

endless means operatively associated with said endless magnetic recording medium for providing electrical conductivity paths representative of said information;

means supplying electrical energy to said endless means for establishing in said information-representative conductivity paths information-representative electrical gradients generating said information-representative thermal gradients in said magnetic recording medium;

means for jointly moving said endless magnetic recording means and said endless means;

means operatively associated with said endless means for applying said information to successive portions of said endless means whereby to establish said magnetic record of said information in successive portions of said endless magnetic recording medium;

means for applying a magnetic printout agent to said magnetic record to produce a printable pattern manifesting said information;

means for printing said pattern on a printout carrier; and means for erasing said magnetic record after printout.

2. Apparatus as claimed in claim 1, wherein:

said magnetic printout agent includes fusible material; and said apparatus includes means for fusing said magnetic printout agent to said printout carrier.

3. Apparatus as claimed in claimed in claim 1, wherein:

said magnetic printout agent includes particles of material attracted by magnetic fields, and shells of a fusible material enclosing said particles; and said apparatus includes means for fusing said shells to said printout carrier and for fusing adjacent ones of said shells on said printout carrier to each other.

4. Apparatus for producing a visually and magnetically discernible oscillograph trace of a varying input signal, comprising in combination:

a rotatable drum;

an endless magnetic recording medium on said drum for providing an erasable magnetic trace in response to thermal gradients;

transducing means on said drum for providing electrical conductivity paths in response to radiant energy;

means supplying electrical energy to said transducing means on said drum for establishing in said conductivity paths electrical gradients generating said thermal gradients in said magnetic recording medium;

means for projecting a beam of said radiant energy onto said transducing means on said drum;

means coupled to said drum for rotating said drum relative to said beam of radiant energy;

means for laterally deflecting said beam of radiant energy in response to said varying input signal whereby to provide in said endless magnetic recording medium an erasable magnetic trace representative of said varying input signal;

means for printing out said magnetic trace with a magnetic printout agent; and means for erasing said magnetic trace after printout thereof.

5. Apparatus as claimed in claim 4, wherein:

said beam is a beam of light; and said transducing means include means for providing electrical conductivity paths in response to light.

6. Apparatus for producing prints of information, comprising in combination:

means for providing a magnetic field;

endless means for providing electrical conductivity paths representative of said information;

an endless magnetic recording medium in at least thermal contact with said endless means for providing an erasable magnetic record of said information in response to said magnetic field and thermal gradients representative of said information;

means for moving said endless means and endless magnetic recording medium relative to said means for providing said magnetic field to expose successive portions of said endless magnetic recording medium to said magnetic field;

means for supplying electrical energy to said conductivity paths to establish said thermal gradients;

means for printing out said magnetic record; and means for erasing said magnetic record after printout thereof.

7. Apparatus as claimed in claim 6, wherein:

said means for providing a magnetic field include means for providing an alternating magnetic field whereby to provide said magnetic record with alternating magnetic gradients.

8. Apparatus for producing an oscillograph trace of a varying input signal, comprising in combination:

means for providing a magnetic field;

means for providing a beam of radiant energy;

means for deflecting said beam of radiant energy in response to said varying input signal;

a rotatably drum;

means on said drum for providing electrical conductivity paths corresponding to said deflections of said beam of radiant energy;

an endless magnetic recording medium on said drum in at least thermal contact with said conductivity paths providing means for providing an erasable magnetic oscillograph trace in response to said magnetic field and thermal gradients representative of said deflections;

means for rotating said drum relative to said means for providing said magnetic field to expose successive portions of said magnetic recording medium to said magnetic field;

means for supplying electrical energy to said conductivity paths to establish said thermal gradients;

means for printing out said magnetic oscillograph trace; and means for erasing said magnetic oscillograph trace after printout thereof.

9. Apparatus as claimed in claim 8, wherein:

said means for providing a magnetic field include means for providing an alternating magnetic field whereby to provide said magnetic oscillograph trace with alternating magnetic gradients.

* * * * *